Patented June 25, 1935

2,006,039

UNITED STATES PATENT OFFICE 2,006,039

UNSYMMETRICAL DI-ALKYL OR ALKYL-ARALKYL DERIVATIVES OF RESORCINOL AND PROCESS OF MAKING SAME

William E. Austin, New York, N. Y., assignor to Redro Laboratories, Inc., a corporation of New York No Drawing. Application September 14, 1932, Serial No. 633,086

7 Claims. (Cl. 260—154)

My invention relates to unsymmetrical di-substituted derivatives of resorcinol in which the two substituting groups are unlike and may be two unlike alkyl groups or an alkyl and an aralkyl group.

I have discovered that unsymmetrical di-alkyl and alkyl-aralkyl derivatives of resorcinol which can be formed by treating resorcinol or certain mono-substituted resorcinol derivatives with suitable substances to provide for the two unlike radicals have distinctly different properties from symmetrical di-alkyl derivatives of resorcinol. Klarmann (Journal American Chemical Society 48 (1926) pp. 2358-67) pointed out that the symmetrical dialkyl resorcinols have low germicidal power whereas the unsymmetrical di-substituted derivatives of resorcinol possess the remarkable and unexpected property of high germicidal activity.

Furthermore, the respective unsymmetrical compounds of my invention are substantially non-toxic and non-irritating and therefore are available for preparations to be taken internally into the human body.

Other useful and valuable properties of my compounds are the absence of any disagreeable taste and odor in preparations embodying the compounds.

The compounds of my invention have, in addition to their germicidal properties, highly valuable qualities as antiseptics and prophylactics. The fact that these compounds possess such desirable and valuable characteristics combined with substantial lack of taste and odor and virtual non-toxicity when used in dilute solutions, makes the compounds ideal substances for incorporating in the most varied and various types of preparations for internal and external use, such as antiseptic candy lozenges, mouth washes, gargles, douches, suppositories, prophylactic jellies and in any other suitable form.

Among the compounds embodied in the present invention are:

| | Boiling point | Pressure |
|---|---|---|
| Methyl-butyl resorcinol | 160–170° C. | (6-8 mm.) |
| Methyl-amyl resorcinol | 170–178° C. | (6 mm.) |
| Methyl-hexyl resorcinol | 170–180° C. | (5 mm.) |
| Methyl-heptyl resorcinol | 172–183° C. | (4-5 mm.) |
| Ethyl-propyl resorcinol | 140° C. | (3 mm.) |
| Ethyl-butyl resorcinol | 140–150° C. | (3 mm.) |
| Ethyl-amyl resorcinol | 170–175° C. | (3 mm.) |
| Ethyl-hexyl resorcinol | 172–182° C. | (2 mm.) |
| Ethyl-heptyl resorcinol | 175–185° C. | (3 mm.) |
| Ethyl-benzyl resorcinol | 210–220° C. | (6 mm.) |
| Propyl-butyl resorcinol | 165–170° C. | (3 mm.) |
| Propyl-amyl resorcinol | 170–180° C. | (4 mm.) |
| Propyl-hexyl resorcinol | 180–190° C. | (2 mm.) |
| Propyl-heptyl resorcinol | 185–200° C. | (4 mm.) |
| Butyl-amyl resorcinol | 175–190° C. | (5 mm.) |
| Butyl-hexyl resorcinol | 195–205° C. | (5 mm.) |
| Butyl-heptyl resorcinol | 170–190° C. | (2 mm.) |
| Hexyl-heptyl resorcinol | 205–220° C. | (3 mm.) |

These compounds are all either amber-colored syrupy liquids or crystalline solids; are readily soluble in alcohol, ether, acetone, benzol; appreciably soluble in glycerine and glycols; slightly soluble in hydrocarbons; and soluble in varying degrees in compatible combinations of any of these solvents with each other or with water.

The unsymmetrical dialkyl or alkyl-aralkyl resorcinols have as probable general formula $C_6H_2(OH)_2R_1R_2$ where $R_1$ represents an alkyl group, and $R_2$ a different alkyl group or an aralkyl group.

As examples of my process and the resulting compounds, I cite:

(1) Starting from a mono-ketone derivative of resorcinol (which may be prepared by the well-known procedures of treating resorcinol with an acid, acid chloride or acid anhydride of the aliphatic or aromatic series in the presence of a condensing agent such as zinc chloride), a di-ketone derivative is formed by treating in the presence of zinc chloride or other suitable condensing agent with an acid, acid chloride or acid anhydride of the aliphatic or aromatic series, containing a radical different from the substituting radical already present in the resorcinol derivative. The resorcinol di-ketone is then reduced yielding the dialkyl or alkyl-aralkyl resorcinol.

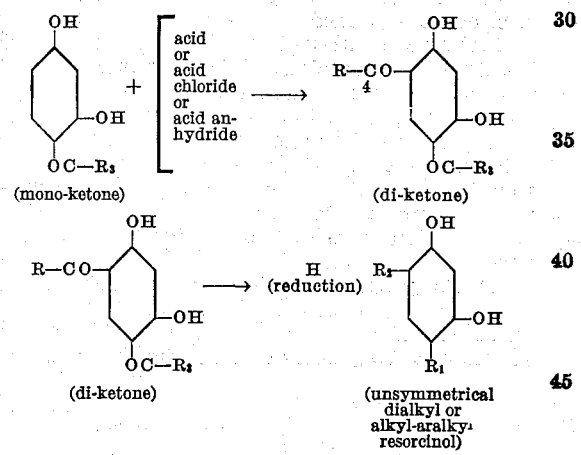

(2) Starting with a mono-alkyl or aralkyl derivative of resorcinol (which may be prepared by reducing a resorcinol mono-ketone such as was used for the starting material for Example #1 and treating as in method #1 above set forth, with an acid, acid chloride or acid anhydride of the aliphatic or aromatic series capable of yielding a radical different from the substituting radical already present in the resorcinol derivative and a condensing agent, a mono-ketone derivative of a mono-alkyl or mono-aralkyl resorcinol is obtained which on reduction yields the dialkyl or alkyl-aralkyl resorcinol.

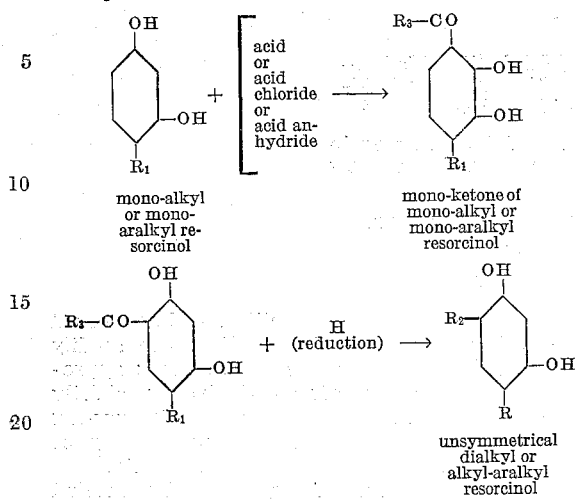

mono-alkyl or mono-aralkyl resorcinol mono-ketone of mono-alkyl or mono-aralkyl resorcinol unsymmetrical dialkyl or alkyl-aralkyl resorcinol (3) Starting from resorcinol the mono-ketone derivative is formed as indicated in method #1, and directly, without isolating, the di-ketone is formed as in method #1, and reduced giving the unsymmetrical di-alkyl or alkyl-aralkyl resorcinol derivative.

The following examples serve to illustrate the methods just described, it being understood that the weights, proportions, temperatures, and other details of procedure may be varied over a wide range.

(1) To prepare ethyl-propyl resorcinol: 300 grams of aceto-resorcinol are melted in a flask fitted with a reflux condenser and a stirrer and immersed in an oil bath. Then 200 grams of propionyl chloride are added rapidly to the melt and the temperature quickly raised to 150° C. Then 60 grams of fused zinc chloride (anhydrous) are added, and the heating is continued for about four hours at 150°–160° C. The temperature is allowed to come down to about 100° C. and 500 c. c. of water added.

Heating is continued for about one hour, and the mixture then cooled, and the di-ketone reduced without isolating, as follows:

The reaction product is added to five liters of water and five liters of concentrated hydrochloric acid and 200 grams of zinc amalgam, and allowed to reflux while vigorously stirred until the reduction is complete. The ethyl-propyl resorcinol is then isolated by distillation under reduced pressure.

(2) To prepare ethyl-benzyl resorcinol: 400 grams of benzyl-resorcinol are melted in a flask on an oil bath, 175 grams of acetyl-chloride are added, then 60 grams of fused zinc chloride, and the heating continued at 150°–160° C. for four or five hours. 500 c. c. of water are then added, and heat applied during one hour. The reduction is carried out as in method #1, although the benzyl-aceto-resorcinol may be separated first by extraction with ether or benzol.

(3) To prepare ethyl-hexyl resorcinol: 450 grams of resorcinol are melted in a flask on an oil bath, and 450 grams of acetic acid anhydride are run in at 150°–155° C., after which 150 grams of zinc chloride are added, and the heating continued at 150° C. After an hour the acetic acid is distilled off under reduced pressure, then 600 grams of caproyl chloride are added slowly, and the heating continued at 150° C. for four hours. The reduction of the di-ketone is carried out as in method #1.

Whereas I have described my invention by reference to specific products and processes whereby they can be obtained it will be understood that many changes and modifications may be made without departing from the spirit of the invention.

I claim:

1. Dialkyl resorcinols of the general formula $C_6H_2(OH)_2R'R''$ wherein $R'$ and $R''$ represent different alkyls one of which contains three or more carbon atoms.

2. Methyl hexyl resorcinol.

3. Ethyl hexyl resorcinol.

4. Methyl heptyl resorcinol.

5. The process of forming unsymmetrical dialkyl or alkyl-aralkyl derivatives of resorcinol by treating resorcinol in the presence of a condensing agent with an acylating compound capable of yielding a substituting radical sought in the final product, thereafter treating the resulting substance in the presence of a condensing agent with an acylating compound capable of yielding a different substituting radical sought in the final product, and then reducing the resorcinol derivative so produced.

6. The process of forming ethyl-hexyl resorcinol by treating resorcinol in the presence of a condensing agent with an acylating compound capable of yielding an ethyl radical in the final product, thereafter treating the resulting substance in the presence of a condensing agent with an acylating compound capable of yielding a hexyl radical in the final product, and then reducing the resorcinol derivative so produced.

7. The process of forming ethyl-hexyl resorcinol by treating resorcinol in the presence of zinc chloride with acetic anhydride, thereafter treating the resulting substance in the presence of zinc chloride with caproyl chloride, and then reducing the resorcinol derivative so produced.

WILLIAM E. AUSTIN.